Dec. 20, 1966     D. W. POLLOCK     3,292,646
BOTTLE CLEANING DEVICE

Filed March 26, 1965     5 Sheets-Sheet 1

David W. Pollock
INVENTOR.

BY Clarence A. O'Brien
and Harvey B. Jacobson
Attorneys

David W. Pollock
INVENTOR.

Dec. 20, 1966  D. W. POLLOCK  3,292,646
BOTTLE CLEANING DEVICE

Filed March 26, 1965  5 Sheets-Sheet 4

David W. Pollock
INVENTOR.

BY Clarence A. O'Brien
and Harvey B. Jackson
Attorneys

Dec. 20, 1966     D. W. POLLOCK     3,292,646
BOTTLE CLEANING DEVICE
Filed March 26, 1965     5 Sheets-Sheet 5
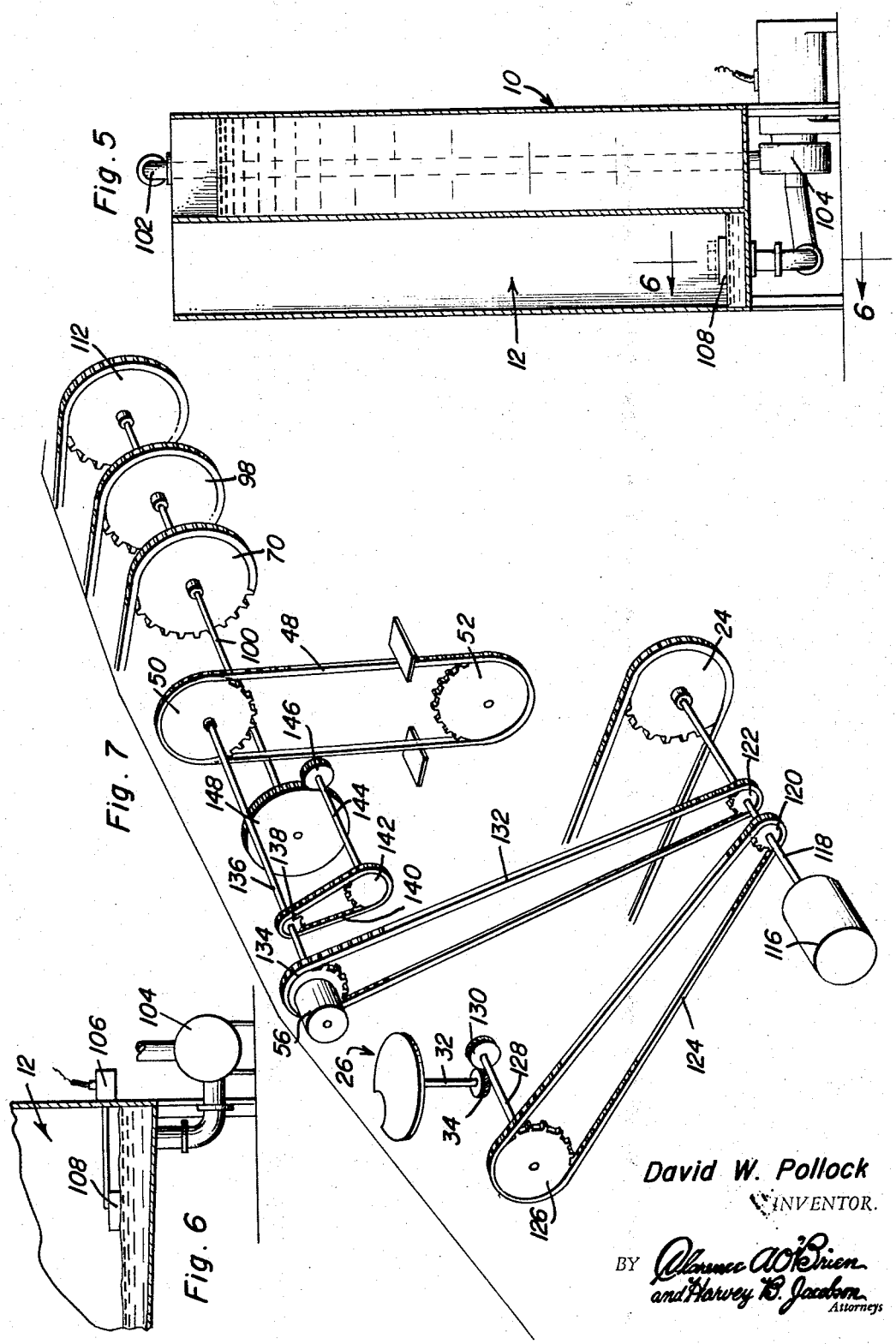
David W. Pollock
INVENTOR.

3,292,646
BOTTLE CLEANING DEVICE
David W. Pollock, Box 4155, Fort
Lauderdale, Fla. 33304
Filed Mar. 26, 1965, Ser. No. 442,864
10 Claims. (Cl. 134—67)

The present invention is generally concerned with a cleaning device for relatively small portable objects, and is more specifically concerned with a device or machine for automatically receiving and subjecting bottles to a cleansing process utilizing an ultrasonic transducing device in conjunction with a suitable cleaning fluid, and subsequently automatically discharging the cleaned bottles. Such a device will find particular adaptation and is specifically intended for use in the cleaning of "steries," empty refillable bottles which, after being washed, still contain, either on the inside or outside, deposits of tar, asphalt, cement, or other hard materials not necessarily miscible in water or steam.

As will be appreciated by those familiar with the art, the use of ultrasonic transducers so as to produce cavitation within a cleaning fluid or solvent which is to receive the articles, in the instant situation bottles, to be cleaned is well known. However, while utilizing this known cavitation phenomena, applicant has devised a unique machine or device whereby the bottles are, at regular intervals, subjected to the effects of the transducer, with the entire operation including the introduction, cleansing and removal of the bottles or similar articles being entirely automatic.

One of the primary objects of the instant invention involves the provision of a relatively compact device wherein a series of parallel longitudinally extending conveyors are provided for effecting the movement of the bottles along adjacent parallel paths during various stages of the operation, in conjunction with laterally directed transfer units for periodically transferring the bottles laterally from one conveyor means to an adjacent conveyor means from the first input or feed conveyor to the last output or discharge conveyor.

Further, in conjunction with the movement of the articles or bottles from the feed conveyor, it is a significant object of the instant invention to provide for a vertical transfer unit which will effect a raising of the periodically introduced bottles to a level above the top of the cleansing tanks for introduction through the open tops thereof, this vertical transfer unit enabling the provision of the feed conveyor at a relatively low height for easy access thereto by an inspector, normally seated, who checks the bottles discharged from conventional cleaning machinery so as to ascertain whether such bottles must in addition be subjected to the cavitation operation.

Further, it is an object of the instant invention to provide for the use of two adjacent open top tanks into which the bottles are alternately introduced, the first tank being substantially completely filled with a cleaning solvent and having the ultrasonic transducer located therein, and the second tank being in the nature of a drainage tank wherein, through an inverting of the bottles, the solvent is drained, the solvent, through a float controlled pump, being periodically returned to the first tank.

In addition, it is a significant object of the instant invention to provide for a synchronization of the movement of the various elements whereby a smooth flow of bottles is achieved, this smooth flow of bottles incorporating periodic and synchronized pauses in the movement of the conveyors for effecting the necessary lateral transfer of the bottles therebetween.

Also, it is an object of the instant invention to provide a bottle spacing unit on the feed conveyor so as to insure a properly spaced relationship between the introduced bottles so as to correspond with the synchronized operation of the remainder of the bottle transferring elements.

Furthermore, it is an object of the invention to utilize periodically operable double-acting fluid cylinder and piston units for effecting the lateral transfer of the bottles to adjacent conveyors, the operation of these cylinder and piston units being synchronized so as to correspond with those periods wherein the movement of the involved conveyors are stopped, the bottles at this time being orientated in a predetermined position for engagement with the pistons.

Likewise, it is a significant object of the instant invention to provide a bottle cleaning device wherein means are provided for retaining the individual bottles during their travel through the transducer containing cleansing tank with these bottles being retained in a manner so as to subject them to the maximum cavitation effect produced by the transducer.

Further, an important object of the instant invention is the provision of a bottle cleaning device which, although completely automatic, is of a nature so as to provide a substantially trouble-free operation requiring only normal maintenance over extended periods of use.

Basically, in achieving the above objects, it is intended that the device of the instant invention include a pair of relatively narrow elongated adjacent tanks constituting a cleansing tank and a draining tank. Positioned outward of the near side of the first or cleansing tank is an endless conveyor or conveying belt upon which the bottles to be cleaned are randomly placed. Along the length of this conveyor is located a bottle spacing unit provided for insuring a predetermined spacing between the bottles as they approach a stop forward thereof. Each bottle, upon engaging the stop, is transferred bodily to a vertically movable elevator platform located between the feed conveyor and the near wall of the tank, this platform transferring the bottle to a point level with the open top of the cleansing tank, at which time a fluid driven piston transfers the bottle onto the top of a conveyor which is momentarily stopped and which travels endless through the cleansing tank carrying the bottles therewith for a subjecting of the bottles to both the cleansing fluid and the effects of the ultrasonic transducer. Simultaneously with the introduction of the first bottle onto the cleansing tank conveyor, a second bottle, previously introduced onto this conveyor, is transferred from the cleansing tank conveyor to a similar conveyor located within the drainage tank with a third bottle already positioned on the cleansing tank conveyor being at the same time discharged onto a discharge conveyor for removal from the device. In this manner a constant flow of bottles through the device is assured with the two tank conveyors and the discharge conveyor being periodically stopped so as to enable the lateral transfer of the bottles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a transverse cross-sectional view taken substantially upon the plane passing along line 5—5 of FIGURE 3;

FIGURE 6 is a partial cross-sectional view taken substantially along line 6—6 in FIGURE 5;

FIGURE 7 is a diagrammatic representation of the gearing utilized in conjunction with the instant invention.

Figure 1:
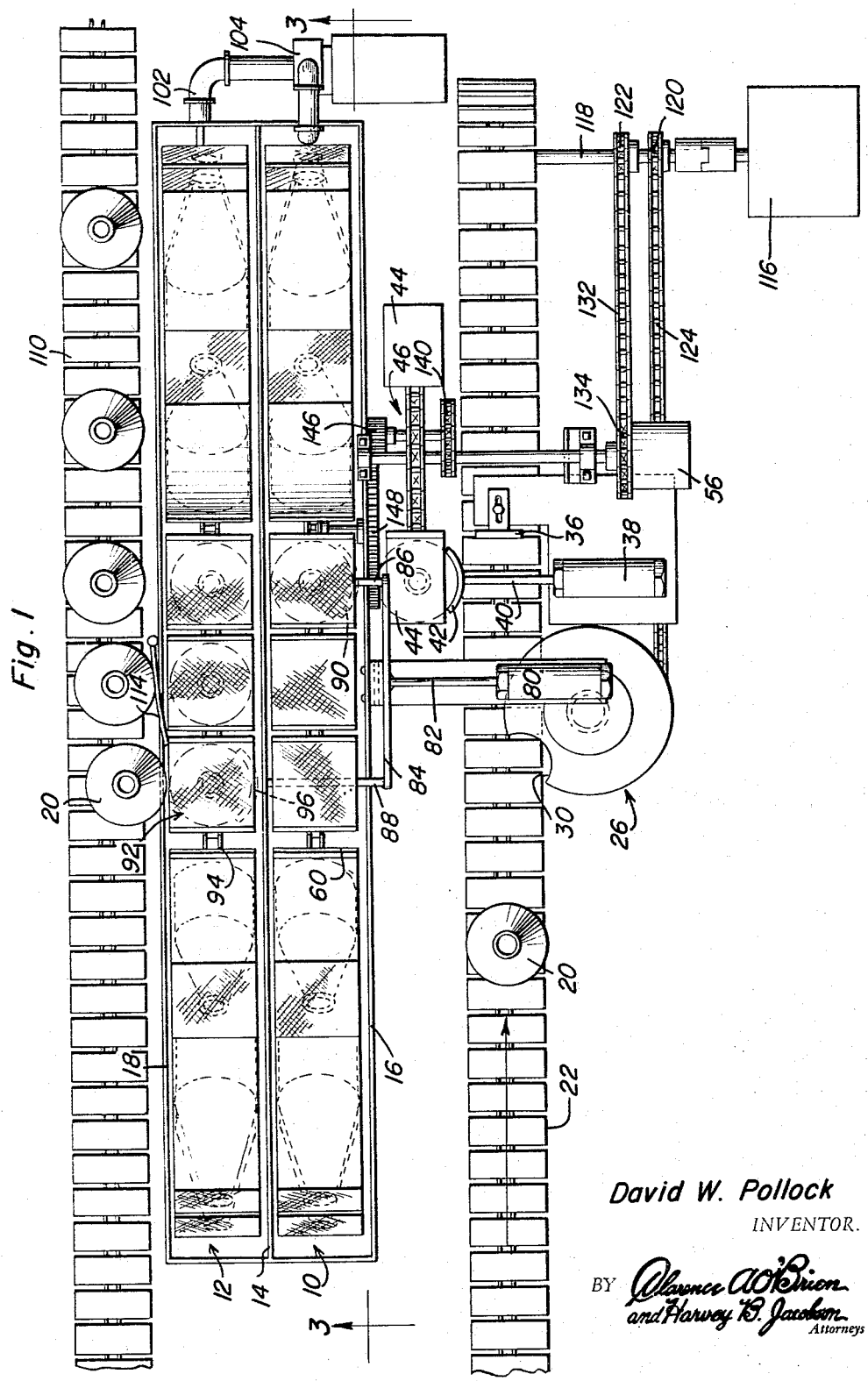
FIGURE 1 is a top plan view of the bottle cleaning device of the instant invention.
Figure 2:
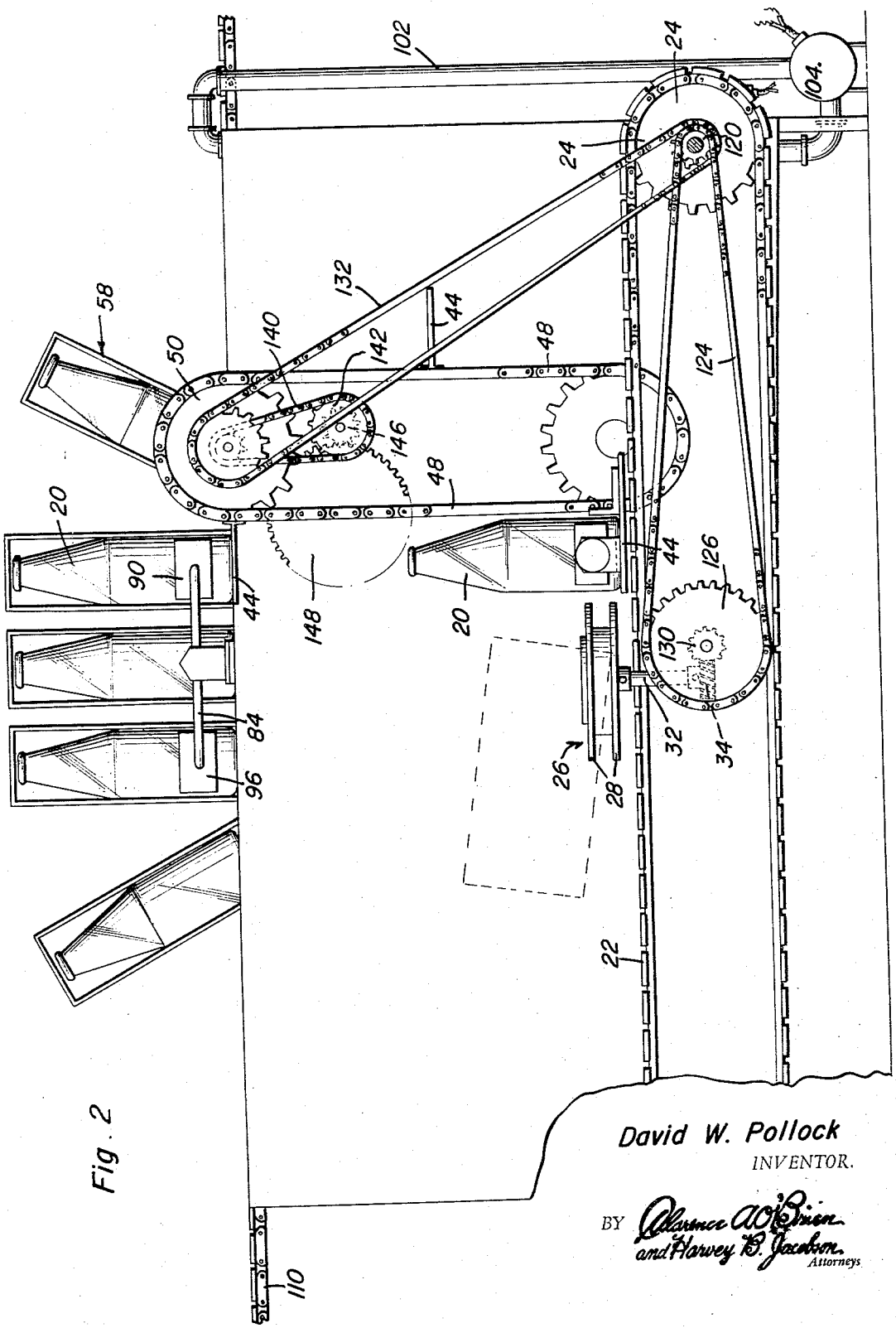
FIGURE 2 is a side elevational view of the device.

Referring now more specifically to the drawings, reference numerals 10 and 12 designate a pair of parallel juxtaposed elongated tanks or tank sections segregated from each other by full height center wall 14. The tank 10 is the cleansing tank with the outside side wall 16 thereof designated as the near wall. The tank 12 constitutes the drain or drainage tank with the outside wall thereof being hereinafter referred to as the far wall 18. These tanks 10 and 12, as will be appreciated from the drawings, are open topped tanks with the tops of the walls 14, 16 and 18 being coplanar.

In actual use, the machine of the instant invention is to be located somewhere in the vicinity of the discharge end of a conventional bottle washing machine. An inspector will normally be present so as to insure that only properly cleaned bottles pass onto the next stage of the operation, generally a sterilization step. Those bottles which fail to pass inspection will be introduced to the apparatus of the instant invention in order to remove the remaining deposits through the use of the cavitation phenomena. The automatic movement of an article, or more specifically a bottle 20 through the apparatus is initiated by the placing of the bottle 20 on the upper run of a smooth faced elongated endless conveyor 22 located outwardly from and parallel to the near wall 16. The feed conveyor 22, driven by an enlarged drive sprocket 24 located adjacent the forward end of the tanks 10 and 12, is generally located substantially below the open upper ends of the tanks 10 and 12 so as to be easily accessible to the bottle inspector who will normally be seated. A suitable end sprocket (not shown) will of course be provided at the opposite end of the feed conveyor 22 along with any necessary idler sprockets.

The flow of the bottles 20 along the feed conveyor 22 is regulated by a horizontally orientated cylindrical rotating member 26 incorporating upper and lower spaced disks 28 projecting inwardly across approximately one-half the width of the feed conveyor 22 over the upper run thereof. The disks 28 each include a pair of vertically aligned semicircular notches 30 therein, one such notch 30 being provided in each disk 28 with the remaining periphery of each disk 28 being smooth. These notches 30 are of a size so as to circumferentially engage a single bottle 20 as the bottle 20 approaches the member 26 with any following bottles 20 being retained against movement while the feed conveyor 22 slips therebeneath by means of the smooth circumference of the disks 28. The bottle 20 received in the notches 30 will of course be discharged forward of the member 26 so as to continue with feed conveyor 22 while the member 26 rotates so as to pick up a second bottle, thereby providing for a specific predetermined spacing between the bottles 20 as they leave the rotating member 26. The rotating bottle spacing member 26 includes a central depending shaft 32 rotatably mounted in a suitably positioned bearing collar 34, this shaft 32 having a helical gear 34 fixed to the lower end thereof through which a constant rotational driving therof is effected as shall be set forth presently.

After the bottle is discharged from the member 26, it continues along the feed conveyor 22 until stopped by an adjustably mounted stop plate or member 36 located lightly above the top run of the feed conveyor 22 so as to enable a free passing and continuing movement of he feed conveyor 22 therebelow. When the bottle 20 comes in contact with the stop 26 a microswitch 37 is tripped, this microswitch 37 in turn actuating a fluid cylinder 38 so as to effect a predetermined extension of the piston 40 associated therewith. As will be appreciated from the drawings, the cylinder 38 is located laterally outward from the feed conveyor 22 in line with the position which will be assumed by the bottle 20 engaged against the stop 36, the piston 40 moving laterally across the upper run of the feed conveyor 22 and pushing the bottle 20 through means of an arcuate shoe 42 mounted on the forward end thereof, the particular size of the shoe 42 used of course corresponding to the circumference of the particular type or size of bottles being cleaned.

The bottle 20 upon being discharged laterally from the feed conveyor 22 is received on the horizontal platform 44 of a vertically moving elevator unit 46, this platform 44 being temporarily located substantially coplanar with the upper smooth surface of the upper run of the feed conveyor 22. A plurality of the elevator platforms 44 are provided on the vertically orientated endless platform chain 48 with the number of platforms 44 and the movement of the endless chain 48, through the upper drive sprocket 50, being synchronized so as to always position one of the platforms 44 coplanar with the upper run of the feed conveyor 22 prior to the discharge of a bottle 20 by the cylinder and piston 38 and 40. An end sprocket 52 is also of course provided, this sprocket 52 being located vertically below the sprocket 50 and in line therewith. The fluid cylinder 38, preferably an air cylinder, is double-acting in nature and solenoid controlled so as to effect an automatic retraction of the piston 40 subsequent to reaching its fully extended position which is intended to position a bottle 20 centrally on a platform 44.

Figure 3:
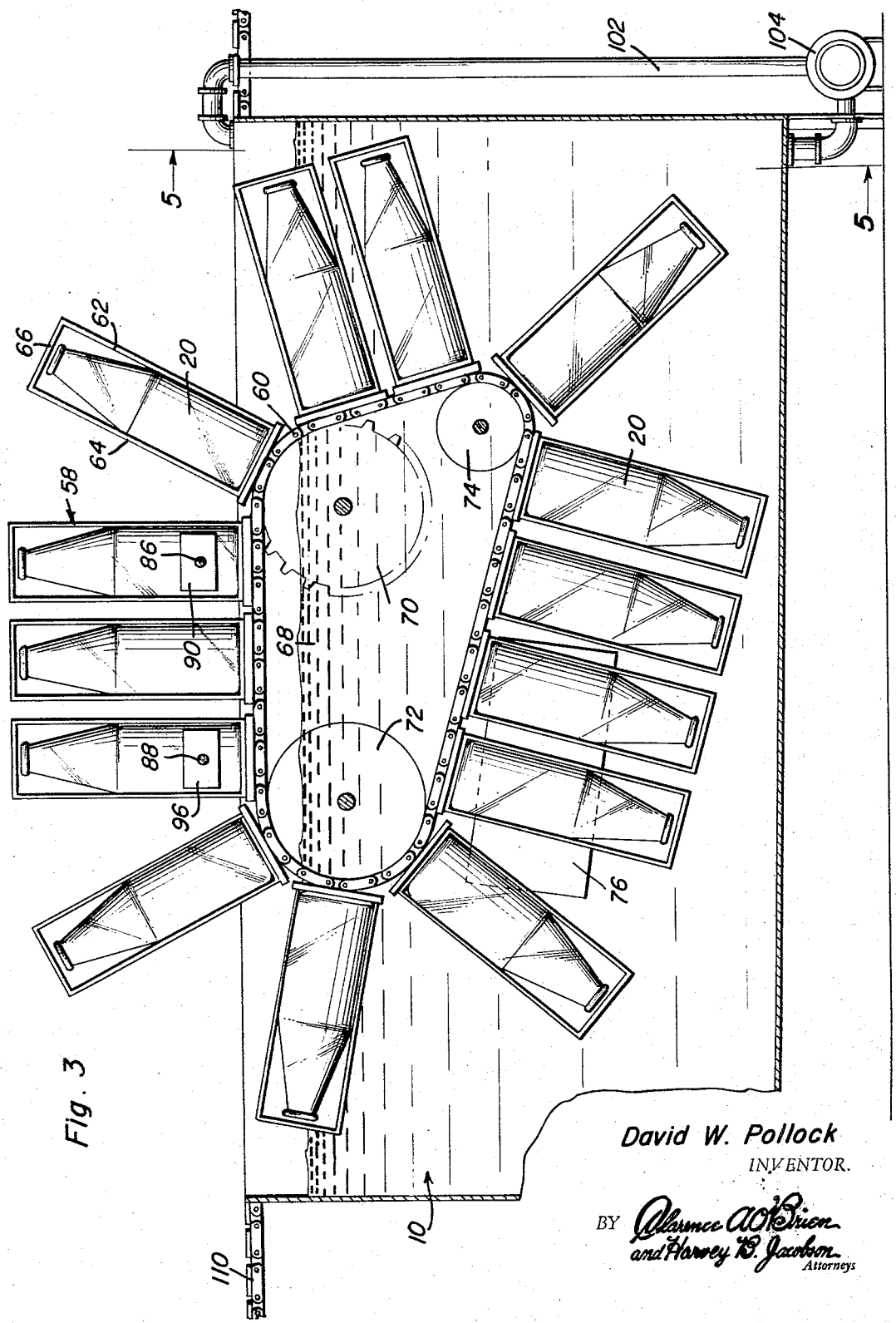
FIGURE 3 is a longitudinal cross-sectional view taken substantially on a plane passing along line 3—3 of FIGURE 1.
Figure 4:
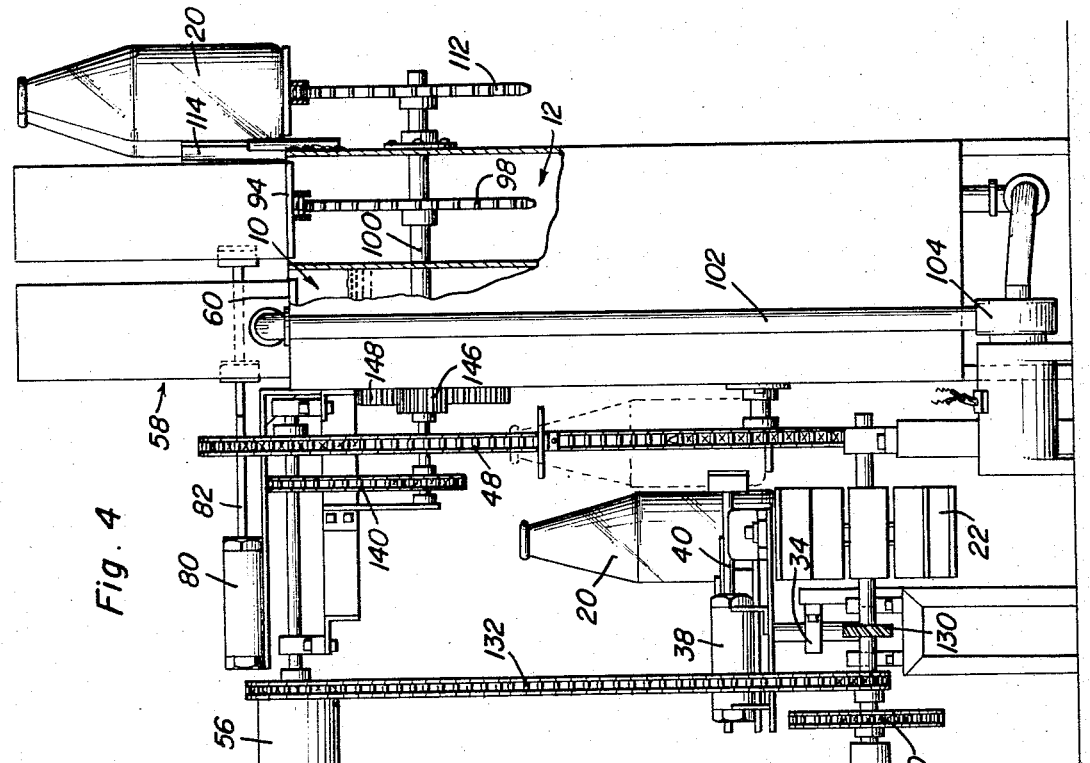
FIGURE 4 is an end elevational view of the device with portions broken away for purposes of illustration.

When the piston 40 returns to its original position laterally outward of the side of the feed conveyor 22, it actuates a second microswitch 54. When the switch 54 has been actuated, a single revolution clutch assembly 56 is engaged and effects a raising of the platform 44 having the bottle 20 thereon to a point at which this platform 44 will be coplanar with the upper edges of the open topped tanks 10 and 12, at this point the clutch assembly 56 is disengaged in the conventional manner. Simultaneously, a second platform 44 has assumed the position of the first mentioned platform 44 coplanar with the upper run of the feed conveyor 22, thus preparing this portion of the device for a repetition of the above described cycle. The initially referred to bottle 22 is now in position to be introduced laterally into the first or cleaning tank 10 where it will be received within one of a series of pockets 58 fixed to an endless conveyor 60. This conveyor 60 includes a horizontal upper run of a length equal to two and preferably three pockets 58, this upper horizontal run of the conveyor 60 being substantially coplanar with the upper edges of the tank walls 14, 16 and 18. Each of the pockets 58 includes, along the path of movement of the conveyor 60, front and rear walls 62 and 64 defining opposed completely open sides into which the bottles 20 can be laterally introduced and discharged. In addition, each pocket 58 is provided with a foraminous top wall 66 so as to enable a free flow of the cleaning fluid 68 therethrough and into the open upper end of the bottle 20 as the bottle is moved through the cleaning fluid 68 by the conveyor 60. As will be best appreciated from FIGURE 3, the conveyor is engaged over aligned drive and end sprockets 70 and 72 as well as a lower idler sprocket 74 located forward of the forward drive sprocket 70, thereby directing the conveyor 60, from the horizontal upper run, forwardly and downwardly at an inclination tending to gradually introduce and invert the bottles 20 so as to insure a substantially complete filling thereof with the cleaning fluid 68 prior to a complete inversion of the bottles 20 and a movement of the bottles past the ultrasonic transducer 76 mounted on the side wall of the cleansing tank 10 and inclined so as to generally conform to the direction of the lower run of the conveyor 60. In being arranged in this manner, it will be appreciated that the open sides of the pockets 58, as well as the foraminous top walls 66 thereof enable a subjecting of the bottles 20 to the full cavitation effect. Incidentally, while not specifically mentioned supra, it should also be appreciated that the front and rear walls 62 and 64 of each of the pockets 58 can also be foraminous so as to further reduce the possible interference to the cavitation. The movement of the conveyor 60, which incidentally is of a width only slightly less than the width of the tank 10, is synchronized to the movement of the elevator unit 46 and similarly controlled by the single revolution clutch assembly 66 whereby the forwardmost pocket 58 of the horizontal top run thereof is always exactly laterally aligned with the bottle supporting platform 44 as it reaches its upper position and as movement of the elevator unit 46 and conveyor 60 stops through disengagement of the clutch assembly 56.

When the elevator platform 44 reaches its upper position in substantially the same plane as the open upper top of the tank 10 and in lateral alignment with the first pocket 58 on the upper run of the conveyor 60 a third microswitch 78 is tripped and an upper double-acting fluid or air cylinder 80 actuated so as to extend a contained piston 82. The leading end of the piston 82 is provided with a transverse bar 84 thereon, the bar paralleling the conveyor 60 and including, on the forward and rear ends thereof, projecting push rods 86 and 88. The forward push rod 86 is in lateral alignment with the laterally aligned platform 44 in its upper position and the forward upper run pocket 58 and is provided with an arcuate bottle transfer shoe 90 on the forward end thereof. The piston 82, in its retracted position, positions the forward push rod shoe 90 outwardly of the near side of the platform 44 so as to not interfere with the normal movement thereof, with this shoe 90, in the extended position of the piston 82, projecting into the corresponding pocket 58 of the conveyor 60 sufficiently so as to locate a bottle 20 centrally therein. The rear push rod 88, normally laterally aligned with the rearmost pocket 58 on the horizontal upper run of the conveyor 60, is of a greater length than the forward push rod 86 and operates so as to, in the extended position of the piston 82, project a bottle 20 which has previously been introduced into one of the pockets 58 and subjected to the cavitating cleansing fluid, laterally beyond the pocket 58 and into a similar pocket 92 similarly fixed to a conveyor 90 mounting in the draining tank 12 as shall be explained presently. The longer rear push rod 88 is of course also provided with an arcuate bottle engaging shoe 96 which, in the retracted position of the piston 82, is located outwardly of the near side of the conveyor 60 so as to not interfere with the movement of this conveyor, and which when the piston 82 is in its extended position is projected through the corresponding pocket 58 and into a correspondingly laterally aligned pocket 92 sufficient so as to centrally locate the corresponding bottle 20 therein. The piston 82 through the double-acting nature of the cylinder 80, will, at the completion of its forward stroke, automatically return to its original position with the shoes 90 and 96 being withdrawn so as to not interfere with the movement of the elevator unit 46 and conveyor 60. The entire device is so synchronized as to effect the movement of the upper piston 82 simultaneously with the lower piston 40 with the withdrawal of both pistons into their extreme retracted position occurring almost simultaneously so as to clear all the moving elements as the one revolution clutch 56 is actuated through the tripping of the switch 54 by the lower piston 40. As noted supra, the movement of the cleansing tank conveyor 60 is also controlled through the one-way clutch 56 simultaneously with the movement of the elevator unit 46, this movement of the conveyor 60 being sufficient so as to move the conveyor 60 forward one pocket length while a bottle 20 is being raised to the upper elevator position for introduction into the pocket 58 previously emptied by the rear push rod 88.

The conveyor 94, as well as the pockets 92 thereon, located in the second or drain tank 12 are duplicates of the conveyor 16 and pockets 58. As will be appreciated from the drawings, the conveyor 94, as well as the pockets 92 thereon, are in juxtaposed lateral alignment with the conveyor 60 and the pockets 58 and similarly are of a width substantially equal to the width of the tank 12. The driving of the conveyor 94 is synchronized exactly with the conveyor 60 and similarly includes, in addition to the drive sprocket 98, an end sprocket and idler sprocket positioned relative to the drive sprocket 98 in the same manner as the sprockets 72 and 74 of the conveyor 60, thereby providing for a movement of the bottles 20, by the conveyor 94, gradually to a completely inverted position within the drain tank 12 so as to effect a complete emptying of the cleaning fluid therefrom prior to discharge from the entire apparatus. The driving of the conveyor 94 is effected through a common drive shaft 100 with the drive sprocket 70 of the conveyor 60, thereby also providing for control of the movement of the conveyor 94 through the one revolution clutch assembly 56. The drain tank itself is normally empty aside from a small amount of drained fluid in the lower end thereof as suggested in FIGURE 5. The lower end of the drain tank 12 is communicated with the open upper end of the cleansing tank 10 through pump controlled piping 102 with the actuation of the pump 104 being controlled through a float controlled microswitch 106, the float 108 being located within the lower portion of the tank 12 as generally indicated in FIGURE 6. In this manner, upon the accumulation of a predetermined amount of cleaning fluid or solvent within the drain tank 12, the pump 104 is activated and the fluid transferred back into the cleansing tank 10, thereby maintaining the supply of fluid 68 within the tank 10.

Located laterally outward of the far wall 18 is a discharge or discharging conveyor 110, which has the upper run thereof horizontally orientated in substantially the same plane as the top edges of the walls 14, 16 and 18 so as to smoothly receive a discharge bottle 20 from the drain tank conveyor 94 subsequent to its complete circuit through the drain tank 12. This discharged conveyor 110 is driven through a drive sprocket 112, similarly mounted on the drive shaft 100 so as to effect a periodic movement of the discharge conveyor 110 through the clutch assembly 56. In addition, it will of course be appreciated that the idler sprockets are also provided for the endless conveyor 110 as needed, this conveyor 110 in most instances projecting forwardly of the tanks 10 and 12 to a suitable unloading point.

The discharge of the bottles from the conveyor 94 to the conveyor 110 is indirectly effected through the push rod 88 in that this rod 88, in moving a bottle 20 from the conveyor 60 to the conveyor 94, causes this bottle to engage a second bottle located laterally thereof on the conveyor 94 and effect a pushing of the second bottle 20 outward of the far side of the conveyor 94 to the adjacent conveyor 110. Inasmuch as the first bottle needs to be centered within the pocket 92 on the conveyor 94, it will be appreciated that the second bottle 28 will not at the same time be completely centered on the conveyor 110. However, this is remedied by providing a guide plate 114 angled so as to engage the inner portion of the bottle 20 as the conveyor 110 moves forwardly with the bottle 20 being gradually guided laterally outward to a center position of the conveyor 110.

As possibly best seen in the diagrammatic illustration of FIGURE 7, the apparatus of the instant invention contemplates utilizing a single power plant or motor 116 located laterally of the near side of the apparatus and coupled to an elongated drive shaft 118 which in turn fixedly mounts, in addition to the feed conveyor drive sprocket 24, two smaller sprockets 120 and 122 for rotation therewith. The sprocket 120, through an elongated endless chain 124, drives an enlarged sprocket 126 drivingly mounted to a laterally directed shaft 128 which in turn mounts and rotates a helical sprocket 130 drivingly engaged with the helical sprocket 34 on the bottle spacing member shaft 32. The sprocket 122 drives, through the endless chain 132, the clutch sprocket 134 which is in selective driving engagement with the elongated shaft 136 through the single revolution clutch assembly 56. The shaft 136, in addition to drivingly mounting the elevator drive sprocket 50, also mounts and drives a sprocket 138 which in turn, through chain 140, drives sprocket 142. The sprocket 142 is fixed to and drives the shaft 144 which in turn drives the gear 146 meshed to the enlarged gear 148 for the driving thereof. Finally, the gear 148, through the elongated shaft 100, drives the conveyor sprockets 70, 98 and 112, thereby providing for a driving of all of the elements of the operation from a single power plant 116.

Figure 8:
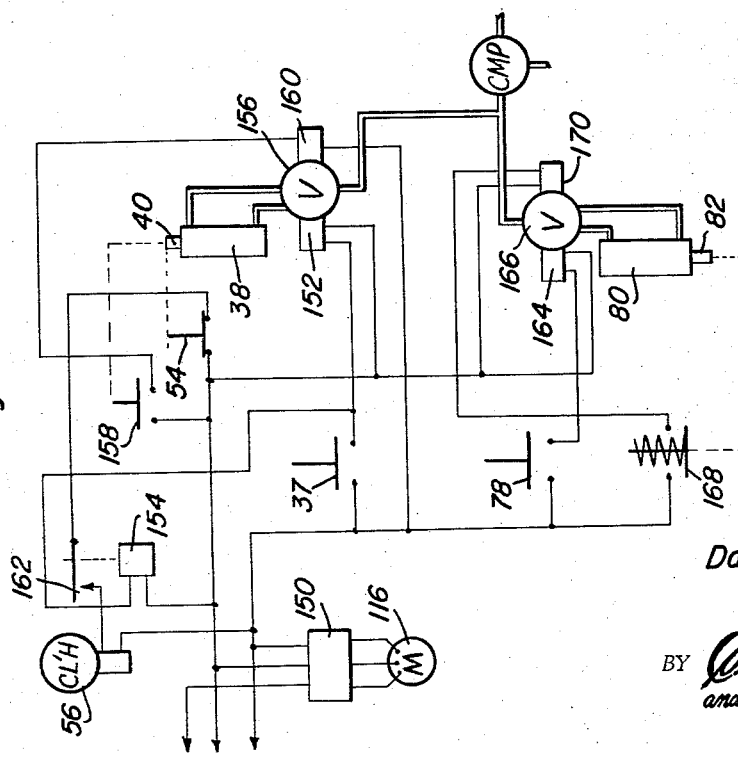
FIGURE 8 is a schematic illustration of one operative control system for the device.

In reviewing the operation of the over-all apparatus, attention is specifically directed to FIGURE 8 wherein one operative system is illustrated. Initially through a suitable starter 150, the motor 116 is energized. A first bottle 20 moves along the lower feed conveyor 22 through the spacing unit 26 into engagement with the stop 36 at which time the switch 37 is closed. Upon closing of the switch 37, the energizing circuits for the forward solenoid 152 and the delay relay 154 are completed to position the control valve 156 for causing an advance of the piston 40. As the piston 40 advances to transfer the bottle 20 to the elevator platform 44, the clutch switch 54 is opened to prevent engagement of the single revolution clutch 56 by the delay relay 154. Although switch 54 is then opened, deenergization of the delay relay 154 is delayed until the cycle is completed. When piston 40 reaches the end of its stroke, the return switch 158 is closed to complete the energizing circuit for the reverse solenoid 160 returning the control valve 156 to its other operative position for reversing the piston 40. When the piston 40 returns to its retracted position, the clutch switch 54 is closed to complete the energizing circuit for the clutch 56 through the relay switch 162 previously closed by the delay relay 154. The one revolution clutch 56 then engages to operate the elevator unit 46 which has received the bottle. The one revolution clutch 56 then disengages when the bottle 20 is elevated to its upper position and the delayed relay 154 is deenergized in preparation for a new cycle started by the closing of the switch 37 once again by the next bottle 20.

When the elevator platform 44 reaches its upper position the switch 78 is closed to complete the energizing circuit for the forward solenoid 164 in the second control valve 166 causing an advance of the piston 82 to move the bottle 20 off the elevator platform 44 onto the cleansing tank conveyor 60, a previously positioned bottle also of course being simultaneously moved from the cleansing tank conveyor 60 to the drain tank conveyor 94. At this time switch 37 is also closed by the next bottle 20 to begin a new cycle. When piston 82 reaches the end of its stroke it is retracted by a closing of the return switch 168 to complete the circuit pulsing the return solenoid 170 of the control valve 166, this occurring at the same time as the lower piston 40 is also being retracted to complete the following cycle.

From the foregoing, it will be appreciated that a highly novel apparatus has been defined, this apparatus providing for a completely automatic cleaning operation wherein bottles are automatically introduced, at given intervals, to a cleansing fluid and subjected to the effects of an ultrasonic transducer operated therein. The bottles are subsequently, and automatically, removed from the cleaning fluid and carried through a draining cycle so as to discharge all of the cleaning fluid therefrom prior to being automatically discharged from the apparatus. Incidentally, while not specifically detailed supra, it will of course be appreciated that suitable supporting structure is to be provided as needed for the various operative elements of the apparatus, including shaft bearings for the various driven shafts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cleaning device for portable articles comprising a pair of adjacent tanks, an article carrying means mounted in and movable about the interior of each tank, a first one of said tanks containing a cleaning fluid, the second one of said tanks constituting a drainage tank, means for periodically introducing an article onto the carrying means in the first tank for movement therewith through the cleaning fluid, said introducing means simultaneously moving a second article from the first tank carrying means to the second tank carrying means, the second article being moved from the first tank carrying means rearward of the point of introduction of the first article to the first tank carrying means along the path of movement of the first tank carrying means.

2. The device of claim 1 wherein said carrying means each consist of an endless conveyor, said conveyors each including a plurality of article receiving pockets, the movement of both conveyors being synchronized so as to maintain a lateral alignment of the pockets, and an article receiving means positioned laterally of and juxtaposed the second tank conveyor on the side thereof opposite from the first tank conveyor, the means introducing an article into a pocket on the second conveyor simultaneously effecting an ejection of any article already in this pocket onto the article receiving means.

3. The device of claim 2 wherein said article receiving means comprises an elongated discharge conveyor.

4. The device of claim 2 wherein said article introducing means comprises a fluid power operated device including a reciprocating piston, said piston including a pair of parallel laterally spaced push rods fixed to the forward end thereof, a first one of said rods having the longitudinal axis aligned laterally across the tank conveyors and in alignment with a predetermined position periodically assumed by the pockets, the second one of said rods having the longitudinal axis aligned laterally of the tank conveyors rearward of the first rod along the path of travel of the conveyors and in alignment with a predetermined position periodically assumed by the pockets, a leading article engaging end on each rod, said first rod being of a length so as to, upon an extension of the piston, position the article engaged thereby generally centrally in the pocket on the adjacent or first tank conveyor, said second rod being of a length so as to, upon an extension of the piston, position the article engaged thereby generally centrally in the pocket on the far or second tank conveyor, said leading ends upon a retraction of the piston, being withdrawn into spaced relation relative to the adjacent edge of the adjacent tank conveyor.

5. The device of claim 4 including means for periodically feeding an article to the first rod for subsequent introduction onto the first tank conveyor, said feeding means including at least one moving platform selectively positionable between the leading end on the first rod, when the piston is retracted, and the adjacent edge of the adjacent tank conveyor.

6. The device of claim 5 wherein said feeding means also includes an elongated feed conveyor, means for spacing articles at equal distances along said feed conveyor, and means for periodically moving an article from the feed conveyor to a platform for subsequent positioning between the first rod and adjacent edge of the first conveyor.

7. A cleaning device for portable articles comprising at least one elongated tank, an endless conveyor mounted in and movable about the interior of the tank, article receiving stations spaced equally about said conveyor, said tank including a near wall and a far wall positioned closely adjacent the opposite sides of the conveyor, and means for periodically and automatically introducing an article laterally past the near wall and into a first predetermined conveyor station and laterally out of a second predetermined conveyor station, rearward of the first station along the path of movement of the conveyor, and past the far wall of the tank.

8. A cleaning device for portable articles comprising a pair of juxtaposed elongated open top tanks, an endless conveyor movably mounted in each tank, article receiving and retaining stations spaced equidistant about each conveyor, the stations on the conveyors being laterally aligned, means synchronizing the movement of the conveyors so as to maintain the lateral alignment of the stations, the upper runs on the conveyors being substantially coplanar with the open tops of the tanks, said pair of tanks including a near side constituting the outer side wall of one of the tanks, and a far side constituting the outer side wall of the second of said tanks, feeder means adjacent the near side for periodically positioning an article in lateral alignment with a predetermined position periodically assumed by the stations during the movement of the conveyors, discharge means adjacent the far side for receiving and removing articles discharged from the second tank, and article moving means for simultaneously moving a first article from the feeder means into a first station on the first tank conveyor, an article from a second station on the first tank conveyor, rearward of the first station, into a first station on the second tank conveyor, and an article from the first station on the second tank conveyor to the discharge means.

9. The device of claim 8 wherein said first tank is a cleansing tank, said cleansing tank containing a cleaning fluid and a transducing device therein, said second tank being a draining tank so as to enable a drainage of the fluid from the articles, and pump controlled means communicating the drainage tank with the cleansing tank for effecting a periodic return of the drained fluid to the cleansing tank.

10. The device of claim 8 wherein said feeder means comprises an elongated article feed conveyor positioned adjacent the near side, said feed conveyor being located below the level of the open top of the adjacent first tank, stop means limiting movement of articles along said feed conveyor, a vertically movable platform positioned laterally between the feed conveyor and the near side of the pair of tanks adjacent the stop means, and means for moving an article laterally off the feed conveyor, upon engagement of the article with the stop means, onto said platform, said platform subsequently moving this article vertically into lateral alignment with the first station on the first tank conveyor.

References Cited by the Examiner

UNITED STATES PATENTS

| 2,262,799 | 11/1941 | Everett | 198—24 |
| 2,789,928 | 4/1957 | Wallerius | 134—134 X |

FOREIGN PATENTS 349,570   3/1922   Germany.

CHARLES A. WILLMUTH, *Primary Examiner.*

ROBERT L. BLEUTGE, *Assistant Examiner.*